(12) United States Patent
Hao et al.

(10) Patent No.: US 8,705,709 B2
(45) Date of Patent: Apr. 22, 2014

(54) VISUAL VOICEMAIL (VVM) RECOVERY

(75) Inventors: Jack Jianxiu Hao, Lexington, MA (US); Dahai Ren, Waltham, MA (US); Wei Xia, Sudbury, MA (US); Lin Song, Waltham, MA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 231 days.

(21) Appl. No.: 13/228,488

(22) Filed: Sep. 9, 2011

(65) Prior Publication Data

US 2013/0064357 A1    Mar. 14, 2013

(51) Int. Cl.
*H04M 1/64*    (2006.01)
(52) U.S. Cl.
USPC ...... 379/88.12; 379/76; 379/179; 379/207.08
(58) Field of Classification Search
USPC ............... 379/67.1, 76, 88.11, 88.12, 144.07, 379/164, 179, 188, 252, 373.01, 100.05, 379/100.06, 207.08, 207.09; 455/412.2
See application file for complete search history.

(56) References Cited

U.S. PATENT DOCUMENTS

| 2007/0041545 | A1* | 2/2007 | Gainsboro | ............... 379/188 |
| 2010/0151831 | A1* | 6/2010 | Hao et al. | ............... 455/412.2 |

\* cited by examiner

*Primary Examiner* — Md S Elahee

(57) ABSTRACT

One or more devices in a visual voicemail system voicemail notification messages indicating voicemails are available for a user of the visual voicemail system and distribute the voicemail notification messages to a network device. The one or more devices receive an indication of a backlog processing requests for the visual voicemail system and stop, based on the indication, distributing the voicemail notification messages to the network device. After the stopping, the one or more devices receive another indication that the backlog processing requests for the visual voicemail system no longer exists and resume, based on the other indication, distributing the voicemail notification messages to the network device.

19 Claims, 8 Drawing Sheets

VISUAL VOICEMAIL (VVM) RECOVERY

BACKGROUND

Visual voicemail is a user-friendly application that adds a visual aspect to managing voicemail messages. Visual voicemail may enable mobile phone users to manage voicemail message in an order of their choice, e.g., in a random order rather than a sequential order.

DETAILED DESCRIPTION OF PREFERRED EMBODIMENTS

The following detailed description refers to the accompanying drawings. The same reference numbers in different drawings may identify the same or similar elements.

When outages to visual voicemail (VVM) systems occur, a backlog of voicemail messages can accrue. In the period following an outage, delivery of backlogged messages to users' devices can consume a much higher level of network resources than is needed for typical provisioned VVM systems. During the recovery period, certain users' mobile devices may automatically make repeated attempts to connect to the VVM system. These repeated attempts, referred to herein as "retries," can further overload VVM system resources and significantly slow the VVM system recovery. Systems and/or methods described herein may provide disaster recovery techniques for VVM systems that manage handset retries and/or utilize geographic redundancy.

In one implementation, systems and/or methods described herein may receive voicemail notification messages (e.g., indicating voicemails are available for a user of a visual voicemail system) and distribute the voicemail notification messages to a network device, such as a VVM application server. The systems and/or methods may receive a recovery configuration file that includes one or more identifiers of a user device model or user application that causes user devices to automatically make repeated attempts to connect to the visual voicemail system. The systems and/or methods may receive an indication of a backlog processing requests for the visual voicemail system and may stop, based on the indication, distributing the voicemail notification messages to the network device. After the receiving the recovery configuration file the systems and/or methods may receive, from a particular user device, a request to access to the visual voicemail system and may send, to the particular user device, a denial-of-service message when the request includes one of the one or more identifiers from the recovery configuration file.

Figure 1:
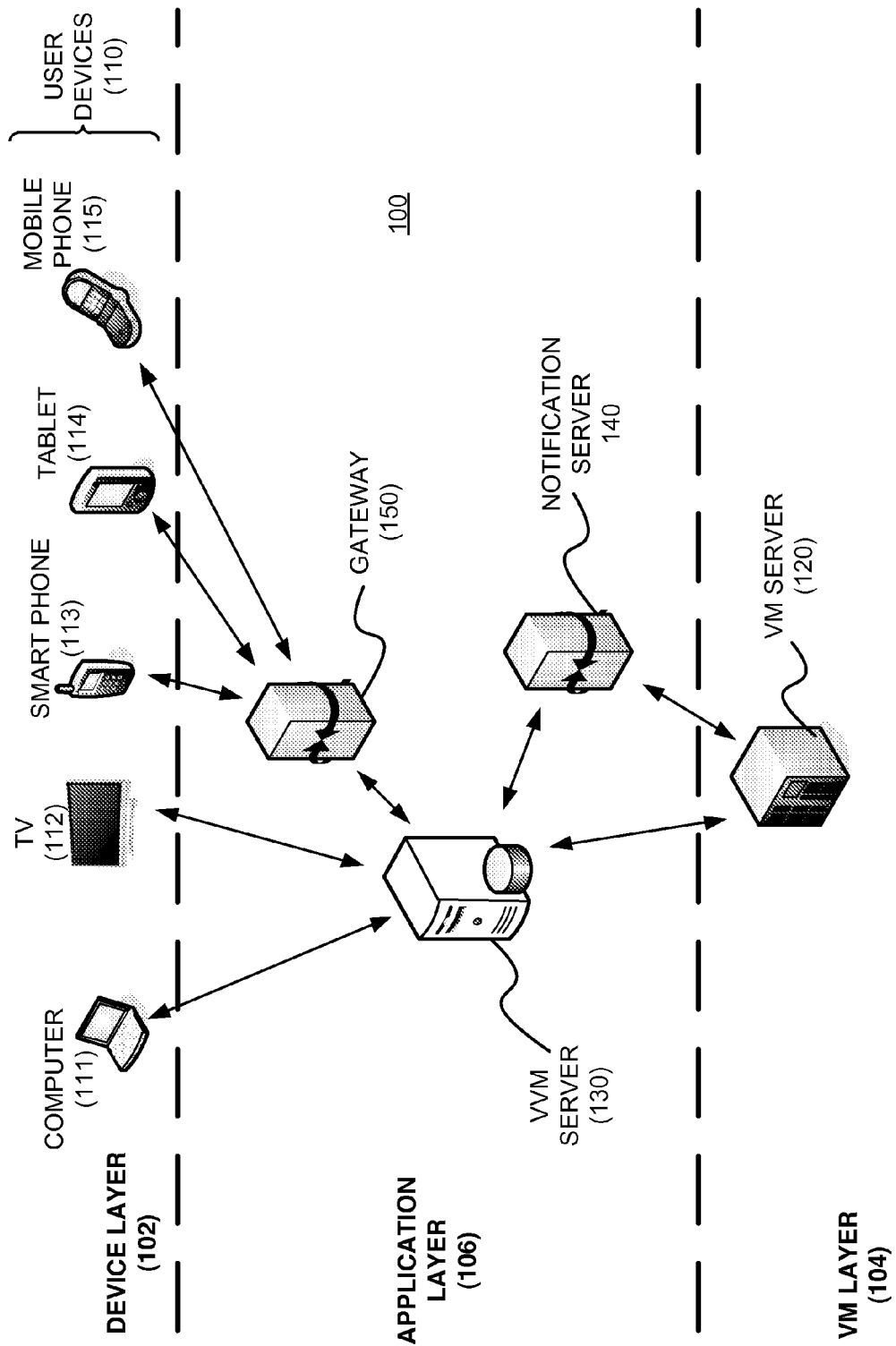
FIG. 1 is an exemplary network in which systems and/or methods described herein may be implemented.

FIG. 1 is an exemplary network 100 in which systems and/or methods described herein may be implemented. As illustrated, network 100 may include a device layer 102, a voice-mail (VM) layer 104, and an application layer 106. Application layer 106 may lie between device layer 102 and VM layer 104 and may facilitate the exchange of messages (e.g., communications) between device layer 102 and VM layer 104. VM layer 104 and application layer 106 may be referred to generally as a VVM system.

Device layer 102 may include user devices 110, such as for example, a computer 111, a television (TV) 112, a smart phone 113 (e.g., a Blackberry™, iPhone™, Droid™, etc.), a tablet 114, a mobile phone 115, and/or another type of communication device. Any of devices 111-115 may be considered user devices 110 and may be referred to herein collectively as "user devices 110" or generically as "user device 110." VM layer 104 may include a VM server 120. Application layer 106 may include a VVM server 130, a notification server 140, and a gateway device 150.

Computer 111 may include one or more computer systems for hosting programs, databases, and/or applications. Computer 111 may include a laptop, desktop, or any other type of computing device. Computer 111 may include a browser application program for navigating a network, such as the Internet.

TV 112 may include a device capable of receiving and reproducing video and audio signals, e.g., a video display device. TV 112 may include a liquid crystal display (LCD), a cathode ray tube (CRT), a plasma display, etc. TV 112 may be associated with a set-top box (STB) (not shown). The STB may include a computer device, such as a cable card, for hosting programs, databases, and/or applications. TV 112 and/or the STB may include a visual voicemail application to receive, listen to, and/or send voicemail messages. TV 112 and/or the STB may be associated with a remote control (not shown) to navigate menus displayed on TV 112 and to otherwise control functions of TV 112 and/or the STB.

Smart phone 113, tablet 114, and/or mobile phone 115 may allow a user to place telephone calls to other user devices. Smart phone 113, tablet 114, and/or mobile phone 115 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), LTE (Long Term Evolution), etc. In one implementation, smart phone 113, tablet 114, and/or mobile phone 115 may communicate with other devices through a wireless local network using WiFi (e.g., IEEE 802.11x). In other implementations, smart phone 113, tablet 114, and/or mobile phone 115 may also communicate with other devices via a wired network, such as a public-switched telephone network (PSTN) or the Ethernet protocol network. Smart phone 113, tablet 114, and mobile phone 115 may include a visual voicemail application to receive, listen to, and/or send voicemail messages.

VM server 120 may include one or more computer systems for receiving and storing voicemail messages in mailboxes associated with one or more user devices, such as user devices 110. Examples of VM server 120 may include the Lucent Automatic Call Distributor (ACD) server and the Comverse Voicemail Service Node (VSN) server. VM server 120 may receive voicemail messages when, for example, a user of user devices 110 does not answer a call request. VM server 120 may deliver the voicemail messages when requested, for example, to one of user devices 111-115 or VVM server 130. In one implementation, VM server 120 may store voicemails for multiple users (e.g., thousands or hundreds of thousands of users).

VM server 120 may notify VVM server 130 of new voicemail messages by sending messages (e.g., SMPP (Short Message Peer-to-Peer Protocol) messages) to VVM server 130 through notification server 140. VM server 120 may also provide voicemail message information (e.g., voicemail message headers) to VVM server 130 by sending messages (e.g., IMAP (Internet Message Mapping Protocol) messages) to VVM server 130 (e.g., through a gateway device, not shown). VM server 120 may also send voicemail message audio files to devices 111-115 via VVM server 130.

VVM server 130 may include one or more computer systems (e.g., network devices) for hosting programs, databases, and/or applications. VVM server 130 may run a web server application, such as Apache, to serve web pages when requested. VVM server 130 may allow a user to access voicemail message over a data network, for example, using computer 111. Additionally, or alternatively, VVM server 130 may run a visual voicemail application. VVM server 130 may request voicemail messages and/or headers from VM server 120 and may forward voicemail messages and/or headers to any one of devices 111-115. In one implementation, VVM server 130 may include a database to store information related to the applications running in VVM server 130, for example. The database may also store voicemail messages and/or headers received from VM server 120 or information received from devices 111-115, for example.

Notification server 140 may receive voicemail message notifications (e.g., SMPP messages) from VM server 120. Notification server 140 may pass notifications of voicemail messages received from VM server 120 to VVM server 130 (e.g., as Hypertext Transfer Protocol (HTTP) messages). Notification server 140 may include one or more computer systems for hosting programs, databases, and/or applications.

Gateway device 150 may receive SMPP (e.g., SMS (Short Message System)) messages from VMM server 130 and may pass the received SMPP messages to user devices, such as user devices 113-115. Gateway device 150 may also receive SMPP messages from user devices 113-115, for example, and pass the received SMPP messages to VVM server 130.

Components of network 100 may interconnect via wired and/or wireless connections. The particular arrangement of components in network 100 has been illustrated in FIG. 1 for simplicity. In practice, there may be more, fewer, different, or differently-arranged components. For example, VM layer 104 may include multiple VM servers 120 (e.g., a work VM server, a home VM server, a wireless VM server, etc.), a directory server, a provisioning server, etc. Also Application layer 106 may include proxy devices, an authentication server, a transcoding server, etc. Although FIG. 1 shows devices 110-150 coupled to each other in a particular configuration, devices 110-150 may also be arranged in other configurations, either coupling directly with each other or through one or more networks, such that any one of devices 110-150 may communicate with any other one of devices 110-150. For example, any one of devices 110-150 may communicate with any other one of devices 110-150 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Figure 2:
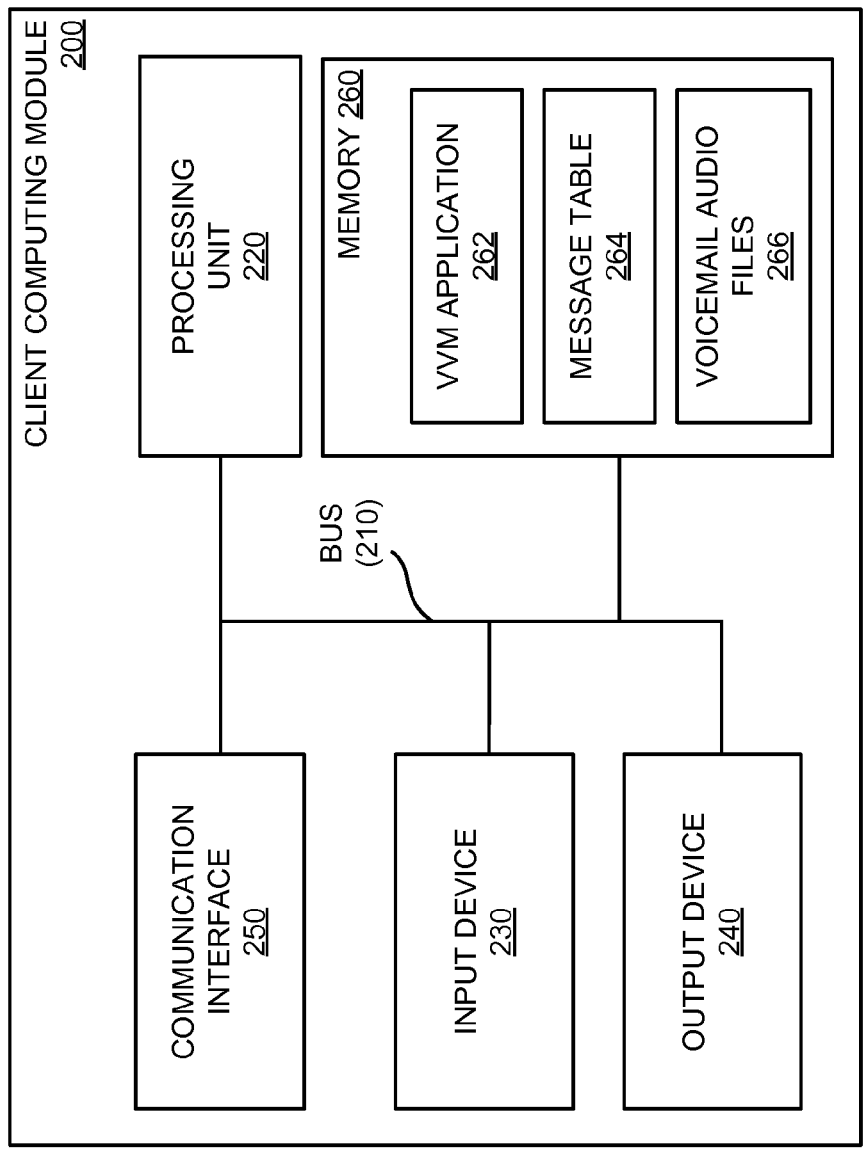
FIG. 2 is a block diagram of exemplary components of a client computer module.

FIG. 2 is a block diagram of exemplary components of a client computing module 200 that may correspond to one or more of user devices 110. User devices 110 may each include one or more computing modules 200. Client computing module 200 may include a bus 210, processing logic 220, an input device 230, an output device 240, a communication interface 250, and a memory 260. Client computing module 200 may include other components (not shown) that aid in receiving, transmitting, and/or processing data. Moreover, other configurations of components in client computing module 200 are possible.

Bus 210 may include a path that permits communication among the components of client computing module 200. Processing unit 220 may include any type of processor or microprocessor (or groups of processors or microprocessors) that interprets and executes instructions. In other embodiments, processing unit 220 may include an application-specific integrated circuit (ASIC), a field-programmable gate array (FPGA), or the like.

Input device 230 may include a device that permits a user to input information into client computing module 200, such as a keyboard, a mouse, a pen, a, a remote control, a touch-screen display, etc. Output device 240 may include a device that outputs information to the user, such as a display, a speaker, etc. Output device 240 may also include a vibrator to alert a user.

Input device 230 and output device 240 may allow the user to activate a particular service or application, such as a visual voicemail application and/or service. Input device 230 and output device 240 may allow the user to receive and view a menu of options and select from the menu options. The menu may allow the user to select various functions or services associated with applications executed by client computing module 200.

Communication interface 250 may enable client computing module 200 to communicate with other devices and/or systems. Communication interface 250 may include a transmitter that may convert baseband signals to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communications interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface for communicating with Bluetooth devices, a near-field communication (NFC) interface, etc. Communication interface 250 may implement a wireless communication protocol, e.g., GSM, CDMA, WCDMA, GPRS, EDGE, etc. Communications interface 250 may also receive, transmit and/or process digital or analog audio inputs/outputs and/or digital or analog video inputs/outputs.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing unit 220; and/or some other type of magnetic or optical recording medium and its corresponding drive, e.g., a hard disk drive (HDD), for storing information and/or instructions.

Memory 260 may include a VVM application 262, a voicemail message table 264 (e.g., database), and voicemail audio files 266. VVM application 262 may allow a user to receive, select, listen to, and act on (e.g., save, forward, or delete) voicemail messages. In some instances, VVM application 262 may cause user device 110 to automatically attempt to retrieve voicemail messages based on alerts (e.g., an SMS message from VVM server 130) and to automatically perform retries when an initial attempt fails. Message table 264 may store a list of voicemail messages including information such as the date and time of a voicemail message, the duration of the message, the status of the message, etc. Voicemail audio files 266 may include audio data of voicemail messages (e.g., in any format, including MP3, WMA, AAC, QCP, QCEP, EVRC, AMR, etc.).

As described herein, client computing module 200 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Figure 3:
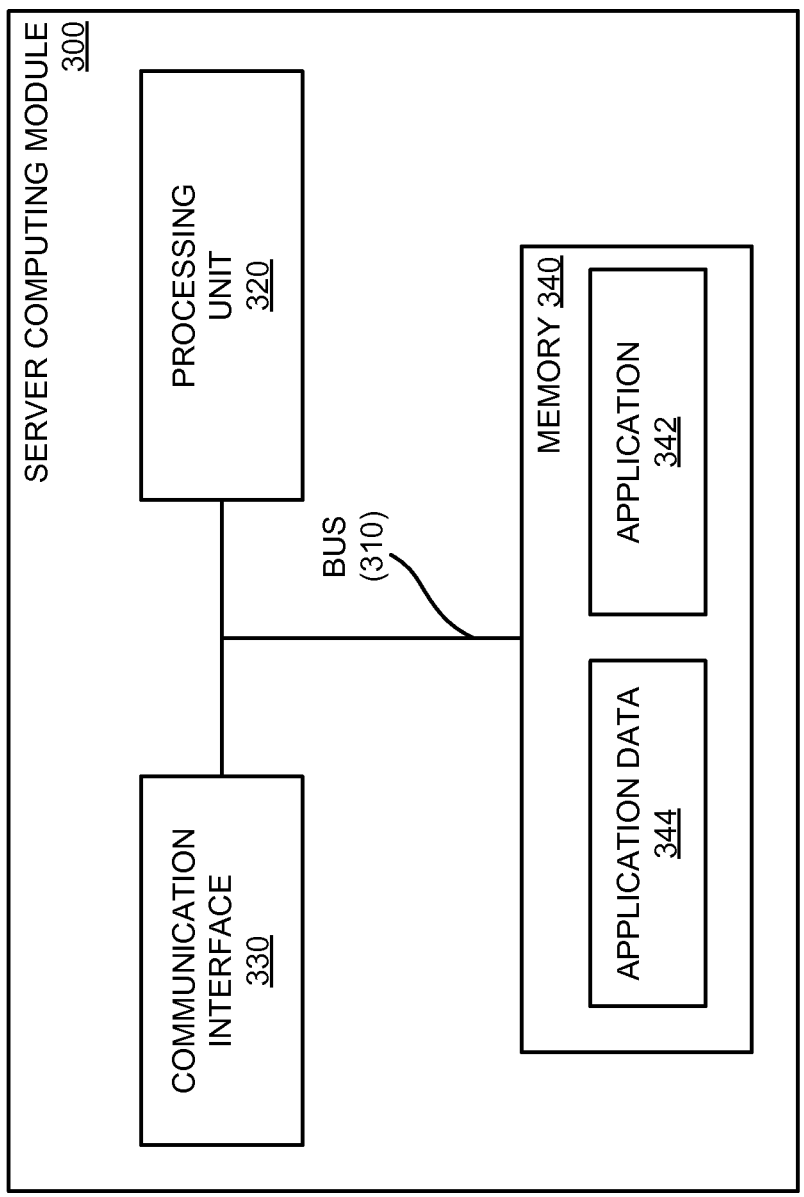
FIG. 3 is a block diagram of exemplary components of a server computing module.

FIG. 3 is a block diagram of exemplary components of a server computing module 300 that may correspond to one or more of components 120-150. Each of components 120-150 may include one or more server computing modules (e.g., a rack of server computer modules), such as computing module 300. Server computing module 300 may include a bus 310, processing logic 320, a communication interface 330, and a memory 340. Server computing module 300 may include other components (not shown) that aid in receiving, transmitting, and/or processing data. Moreover, other configurations of components in module 300 are possible.

Bus 310 may include a path that permits communication among the components of module 300. Processing unit 320 may include any type of processor or microprocessor (or groups of processors or microprocessors) that interprets and executes instructions. In other embodiments, processing unit 320 may include an ASIC, an FPGA, or the like.

Communication interface 330 may enable module 300 to communicate with other devices and/or systems. For example, communication interface 300 may include mechanisms similar to those described above for communication interface 250 for communicating with other devices, such as other devices of network 100.

Memory 340 may include a RAM or another type of dynamic storage device that may store information and instructions, e.g., an application 342 and application data 344, for execution by processing unit 320; a ROM device or another type of static storage device that may store static information and instructions for use by processing unit 320; and/or some other type of magnetic or optical recording medium and its corresponding drive, e.g., a HDD, for storing information and/or instructions.

In the case of notification server 140, for example, application 342 may include an application to receive voicemail messages notifications, from VM server 120, when the users of the user devices 110 do not answer call requests. In one implementation, application 342 may also include a queue management application to notify VVM server 130 of new voicemail messages and enforce notification holds (e.g., based on queue length) during disaster recovery periods. Application data 344 may include voicemail message tables and/or data corresponding to queued items from application 342.

In the case of VVM server 130, for example, application 342 may include an application to receive voicemail message information and corresponding voicemail audio data from VM server 120 and deliver the received voicemail message information and corresponding voicemail audio data to user devices 110. As such, in the case of VVM server 130, application data 344 may also include voicemail message tables and corresponding audio files. In one implementation, application data 344 may also include one or more configuration files to selectively enforce denial-of-service (e.g., blocking VVM service for a particular user device) during disaster recovery periods, while application 342 may apply the configuration files to incoming calls.

Module 300 may perform certain operations, as described in detail below. Module 300 may perform these operations in response to processing unit 320 executing software instructions contained in a computer-readable medium, such as memory 340. The software instructions may be read into memory 340 from another computer-readable medium or from another device via communication interface 330. The software instructions contained in memory 340 may cause processing unit 320 to perform processes that are described below.

Figure 4:
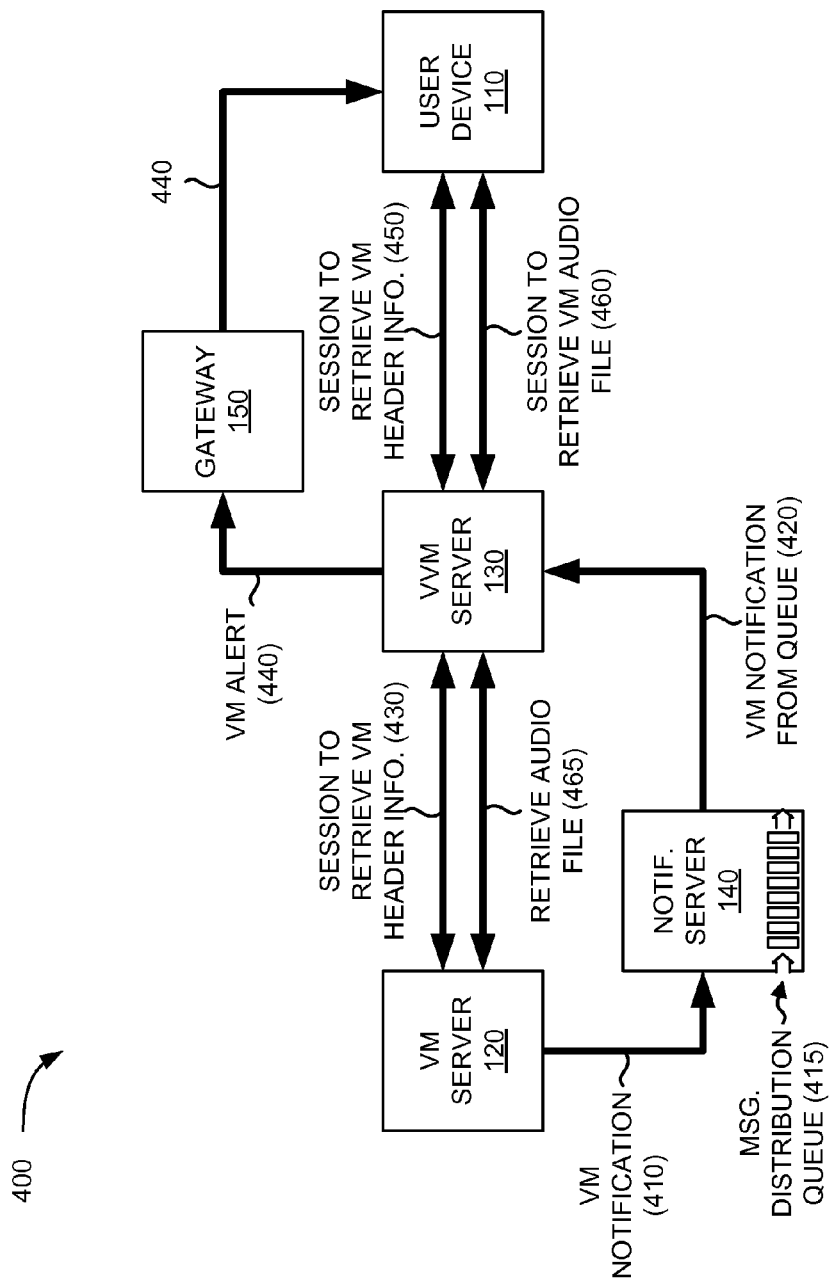
FIG. 4 is a diagram of exemplary communications within a portion of the network of FIG. 1.

FIG. 4 is a diagram of exemplary communications for a portion 400 of network 100. Communications in FIG. 4 may represent normal operating conditions for network 100. As shown in FIG. 4, network portion 400 may include user device 110, VM server 120, VVM server 130, notification server 140, and gateway 150. User device 110, VM server 120, VVM server 130, notification server 140, and gateway 150, and may include features described above in connection with, for example, FIGS. 1-3.

VM server 120 may receive and store new voicemail messages. As shown in FIG. 4, VM server 120 may provide a VM notification 410 to notification server 140, indicating that a new message is available. For example, VM server 120 may send VM notification 410 via an SMPP session. Notification server 140 may receive VM notification 410 and save VM notification 410 into a message distribution queue 415.

Notification server 140 may forward VM notifications from message distribution queue 415 to VVM server 130, as indicated by reference number 420. For example, upon receiving an availability indication (not shown) from VVM server 130, notification server 140 may forward VM notification message 420 to VVM server 130 via an HTTP post.

Notification message 420 may cause VVM server 130 to start a new thread to manage a new voicemail request. In one implementation, in response to notification message 420, VVM server 130 may initiate a session 430 to retrieve voicemail header information from VM server 120. For example, VVM server 130 may implement an application program interface (API) to get a current list of voicemail headers from VM server 120. VVM server 130 may store the list of voicemail headers in a database cache for future use by user devices 110. Header information may include, for example, information about the received voicemail, such as a caller ID, time of call, recipient ID, etc.

VVM server 130 may provide a VM alert 440 to user device 110. For example, VVM server 130 may notify a particular user device 110 with a voicemail location, a number of the new voicemail, and the latest voicemail ID. In the case of smart phone 113, tablet 114, and/or mobile phone 115, VM alert 440 may be forwarded as an SMS message via gateway 150 using a mobile directory number (MDN) for the particular user device 110. Based on the content of VM alert 440, user device 110 may decide if a call (e.g., an HTTP call) to VVM server 130 is necessary to retrieve voicemail header information.

Assuming user device 110 determines that a call to retrieve voicemail header information is necessary, user device 110 may retrieve updated voicemail header information. For example, user device 110 may initiate a session 450 with VVM server 130 to retrieve voicemail header information. Using session 450, user device 110 may provide model, operating system, and/or application version information associated with user device 110. For example, user device 110 may submit in session 450 a user device make, a model number, a VVM application type, and/or other information as part of a request for voicemail header information. In response to requests in session 450, VVM server 130 may provide voicemail header information from session 430 to user device 110 via session 450. User device 110 may compare the retrieved voicemail header information from session 450 with information stored on user device 110. Based on information from session 450, user device 110 may determine if it needs to pre-fetch a voicemail audio file (e.g., that corresponds to retrieved voicemail header information identified in session 450).

Assuming user device 110 is required to pre-fetch the voicemail audio file, user device 110 may initiate a session (e.g., an HTTP connection) with VVM server 130 to retrieve the voicemail audio file, as indicated by reference 460. In one implementation, session 450 for header information and session 460 for the audio file may be the same. In response to retrieve audio file session 460, VVM server 130 may maintain the session with user device 110 while initiating another session (e.g., another HTTP connection) with VM server 120 to retrieve the voicemail audio file, as indicated by reference 465. VVM server 130 may then supply the voicemail audio file to user device 110 using session 460. A typical session 460 to resolve a request of the voicemail audio file may range from 3 to 10 seconds in length.

In the event of a service disruption (e.g., when VM server 120 or VVM server 130 goes down), user devices 110 may be unable to retrieve voicemail information. Even when services by VM server 120 and/or VVM server 130 are restored after a disruption, backlogs in VM server 120 and/or VVM server 130 may prevent timely responses to user devices 110 for sessions 450 to retrieve voicemail header information or sessions 460 to retrieve voicemail audio files. In response to a failed session 450/460, some user devices 110 may generate automatic retries. A significant amount of retries can slow the VVM system recovery, as VVM server 130 processes numerous duplicative sessions.

Figure 5:
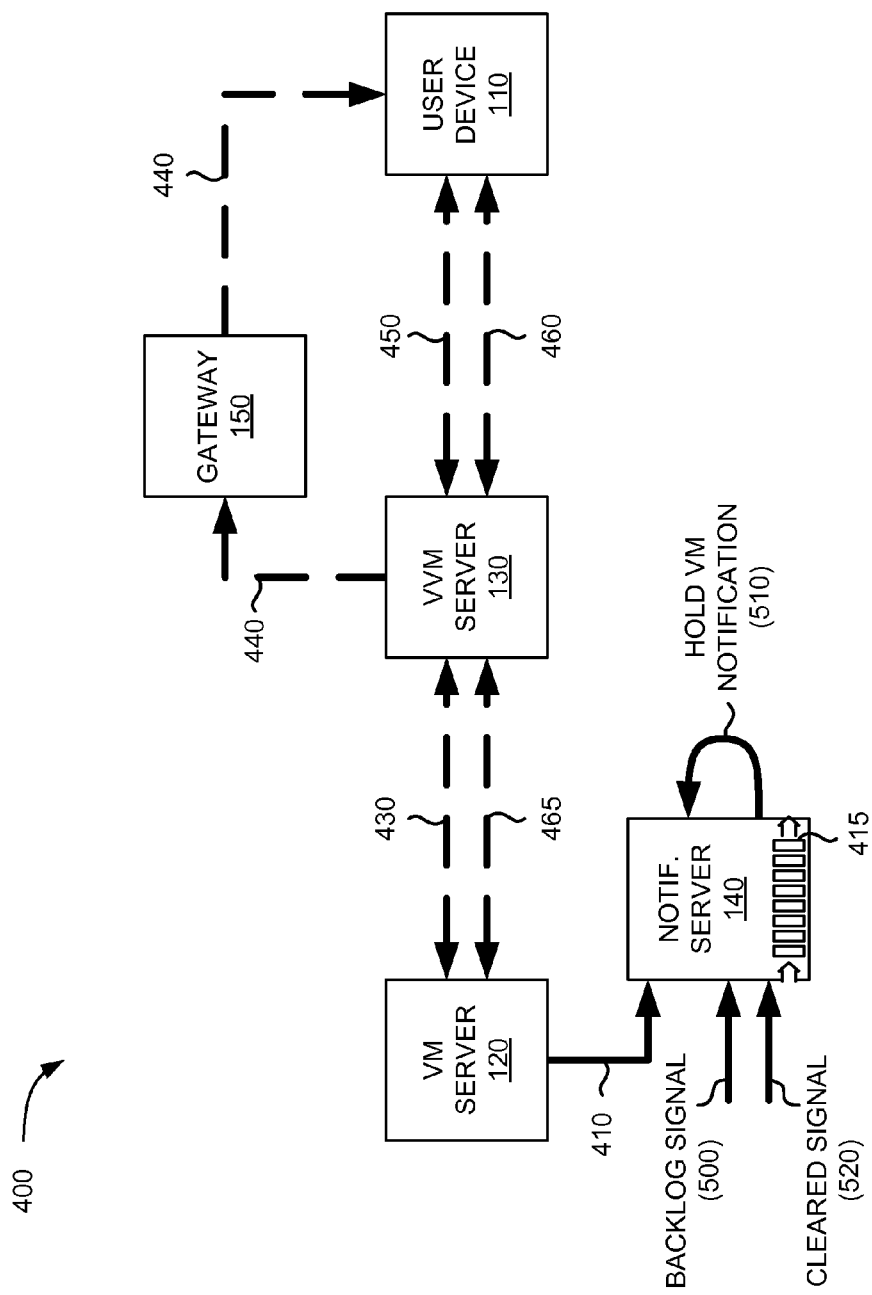
FIG. 5 is a diagram of additional exemplary communications for the network portion of FIG. 4.

FIG. 5 is a diagram of additional exemplary communications for network portion 400. Communications in FIG. 5 may represent recovery operations for network 100 using a queue hold, according to one implementation. Referring to FIG. 5, notification server 140 may receive a backlog signal 500 indicating VVM traffic has exceeded the VVM system capacity. Backlog signal 500 may be provided from one or more sources. For example, backlog signal 500 may be internally generated by notification server 140 based on the length of message distribution queue 415 and/or a time delay in processing items in message distribution queue 415 (e.g., a particular queue length or time threshold to process a message in queue 415). As another example, backlog signal 500 may be generated based on feedback from either VM server 120 or VVM server 130. In still another example, backlog signal 500 may be a separate communication generated from a network administrator's account (e.g., direct user input).

In the implementation of FIG. 5, notification server 140 may be configured to hold items in message distribution queue 415 during recovery (e.g., VVM system backlog) periods. 415 Based on backlog signal 500, notification server 140 may hold new voicemail notifications (e.g., from VM notification 410) in queue 415, as indicated by reference number 510. The hold will prevent new notification messages (e.g., notification messages 420) from triggering additional activity in network portion 400. More particularly, hold 510 may prevent VVM server 130 from sending VM alert 440 to user devices 110. Without VM alert 440, user device 110 will not automatically connect to VVM server 130, thus reducing data traffic from sessions 450 to retrieve voicemail header information or sessions 460 to retrieve voicemail audio files 460.

When the VVM system has resumed normal levels of operation, notification server 140 may receive a cleared signal 520 indicating VVM server 130 can resume receiving notification messages 420. Cleared signal 520 may be provided from one or more sources. For example, cleared signal 520 may be generated based on feedback from either VM server 120 or VVM server 130. In another example, cleared signal 520 may be a separate communication generated from a network administrator's account (e.g., direct user input). Based on cleared signal 520, notification server 140 may release notification messages 420 to VVM server 130.

Figure 6:
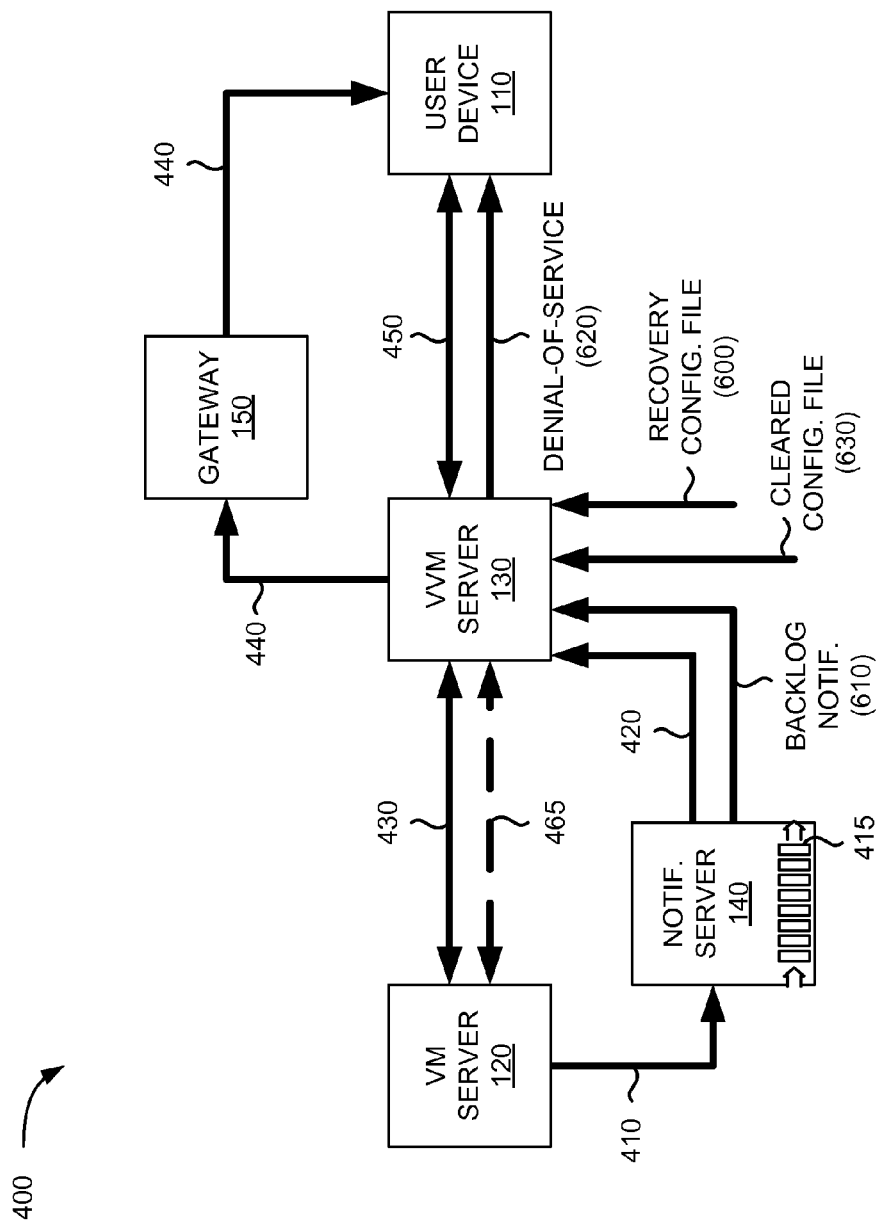
FIG. 6 is a diagram of further exemplary communications for the network portion of FIG. 4.

FIG. 6 is a diagram of additional exemplary communications for network portion 400. Communications in FIG. 6 may represent recovery operations for network 100 using denial-of-service messages, according to another implementation. Referring to FIG. 6, VVM server 130 may receive a recovery configuration file 600. In one implementation, recovery configuration file 600 may include user device makes and/or model numbers, software versions, etc. that are known (or suspected) to generate retries. Additionally, or alternatively, recovery configuration file 600 may include criteria (e.g., a particular number of requests from the same device) that may be indicative of uncontrolled retries. For example, if VVM server 130 typically receives fewer than ten requests per day from a user device 110, recovery configuration file 600 may have a set limit of fifty requests per day. If VVM server 130 receives more than fifty requests, then the particular user device 110 may be flagged as generating retries.

As described further below, VVM server 130 may receive and store recovery configuration file 600 for use in processing incoming requests (e.g., sessions 450/460 initiated by user device 110). Recovery configuration file 600 may be provided, for example, by a separate communication generated from a network administrator's account (e.g., direct user input). In one implementation, receipt of recovery configuration file 600 by VVM server 130 may trigger VVM server 130 to implement the criteria in recovery configuration file 600. In another implementation, a separate notification signal (e.g., backlog notification signal 610) may trigger VVM server 130 to apply the criteria in recovery configuration file 600. In one implementation, recovery configuration file 600 may be issued when a backlog in the VVM system is detected and another different configuration file may be issued when the VVM system recovery is complete.

VVM server 130 may receive a backlog signal 610 indicating VVM traffic has exceeded the VVM system capacity. In one implementation, backlog signal 610 may cause VVM server 130 to apply recovery configuration file 600 to incoming calls. Backlog signal 610 may be generated, for example, by notification server 140 based on the length of message distribution queue 415 and/or a time delay in processing items in message distribution queue 415. As another example, backlog signal 610 may be generated based on feedback from either VM server 120 or VVM server 130. In still another example, backlog signal 610 may be a separate communication generated from a network administrator's account.

In the implementation of FIG. 6, VVM server 130 may be configured to provide denial-of-service messages (e.g., preventing use of VVM services) for particular types of user devices 110 during recovery (e.g., VVM system backlog) periods. After receiving recovery configuration file 600 and/or backlog notification 610, VVM server 130 may receive notification messages 420 from notification server 140. VVM server 130 may retrieve the voicemail header information (e.g., retrieve during session 430) from VM server 120 and may send VM alert 440 to user device 110. In response to VM alert 440, user device 110 may initiate session 450 to retrieve voicemail header information. Session 450 may include device and/or application information associated with user device 110. In response to the requests in session 450 to retrieve voicemail header information, VVM server 130 may perform a lookup of recovery configuration file 600.

Based on a comparison of the device and/or application information for user device 110 and recovery configuration file 600, VVM server 130 may return a denial-of-service message 620 to user device 110. For example, VVM 130 may provide an error message (e.g., service not available) to user device 110. The error message, when received by user device 110, will prevent user device 110 from sending retries. Thus, depending on the scope of recovery configuration file 600, VVM server 130 may block service for particular types of user devices 110 or particular application versions running on user devices 110. Alternatively, recovery configuration file 600 may cause VVM server 130 to block retries from all user devices 110. When sending denial-of-service message 620, VVM server 130 may also not conduct sessions, associated with particular request from user device 110, to retrieve voicemail audio files 460. By selectively blocking retries from user devices 110, VVM server 130 may avoid duplicative requests/sessions, allowing VM server 120 to clear the backlog of new requests more efficiently.

In one implementation, when the VVM system has resolved the backlog (e.g., the backlog indicated by backlog notification 610), VVM server 130 may receive a cleared configuration file 630. Cleared configuration file 630 may include, for example, more general configurations that do not block retries or that block retries based on different criteria (e.g., based only on receiving too many calls from the same device). Cleared configuration file 630 may be provided, for example, by a separate communication generated from a network administrator's account (e.g., direct user input). In one implementation, receipt of cleared configuration file 630 by VVM server 130 may trigger VVM server 130 to implement the new criteria in cleared configuration file 630. In another implementation, a separate notification signal (not shown) may trigger VVM server 130 to apply the criteria in cleared configuration file 630.

Figure 7:
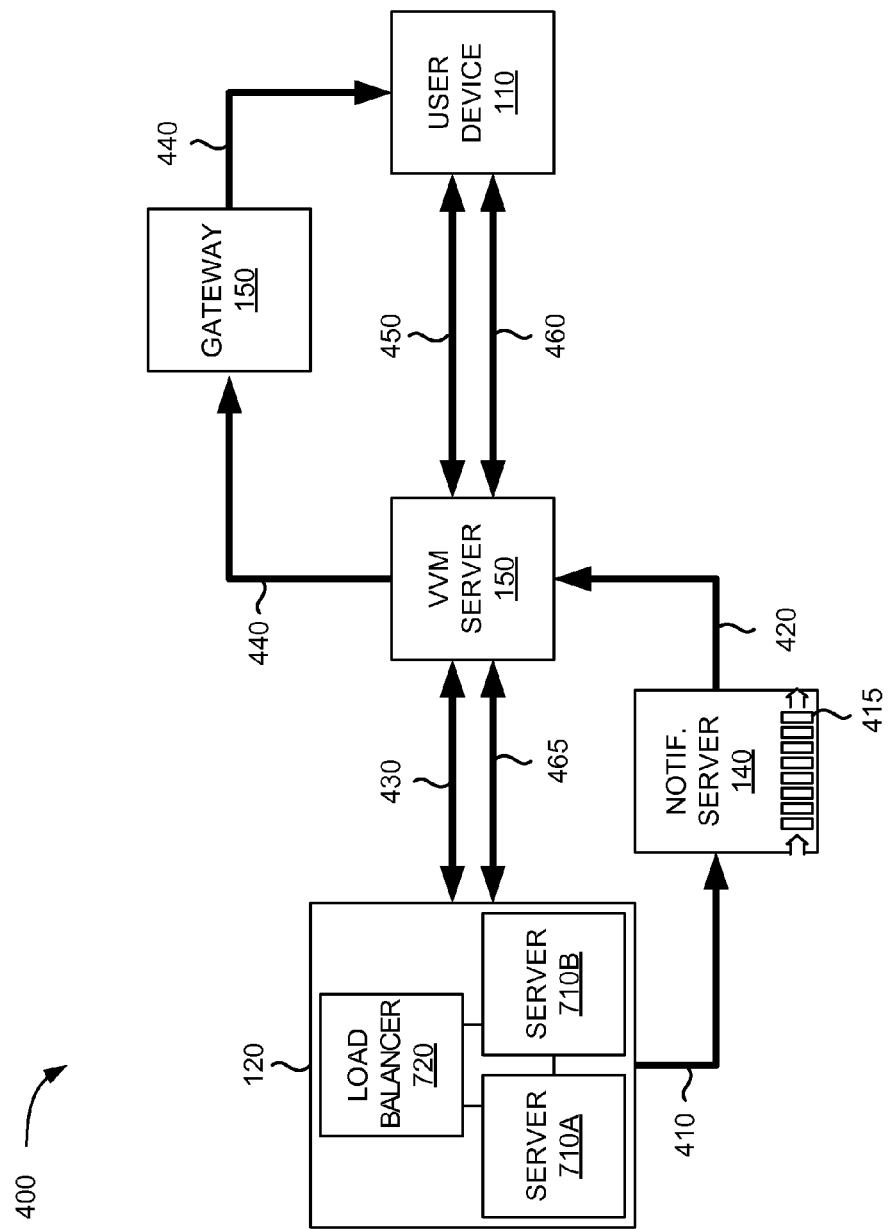
FIG. 7 is a diagram of exemplary communications within an alternate configuration for the network portion of FIG. 4.

FIG. 7 is a diagram of additional exemplary communications for network portion 400. Communications in FIG. 7 may represent other a geographic redundancy arrangement for VM server 120, according to another implementation. As discussed above, VM server 120 may include one or more computer systems such as, for example, a cluster of servers (e.g., in the same geographic area). Referring to FIG. 7, VM server 120 may include servers 710A and 710B, and a load balancer (e.g., a router) 720. While two servers 710A and 710B and one load balancer 720 are shown in FIG. 7 for simplicity, in practice, more servers and/or load balancers may be include in a VM server 120 cluster.

Each of servers 710A and 710B may have functionality similar to that of VM server 120 described above. Thus, servers 710A and 710B may store voicemail messages, notify VVM server 130 of new voicemail messages, and send voicemail message audio files. A cluster of servers may provide for scalability, load balancing, and reliability. Regarding scalability, as the number of users that subscribe to the services provided by VM server 120 increases, for example, the extra load may be borne by adding another server 710 rather than replacing existing servers. Regarding load balancing, as requests for services are received by VM server 120, for example, these requests may be distributed across the different servers (e.g., servers 710A and 710B) in the cluster. For load balancing, a cluster may include a router (e.g., load balancer 720) for sending requests, for example, to the different servers. In other implementations, load balancer 720 may be excluded. Servers 710A and 710B may be arranged in a primary/backup configuration (e.g., where one server handles all request unless there is a problem/backup), in a distributed load configuration (e.g., where available audio files are distributed among servers and request are serviced based on assigned location of the audio file), or with full redundancy (e.g., where available audio files are stored on multiple servers and request are serviced based on direction of the load balancer). Regarding reliability, for example, if one of the servers (e.g., server 710A) in the cluster should fail, the remaining server(s) (e.g., server 710B) in the cluster may provide uninterrupted (or near uninterrupted) services provided for by the cluster.

In one implementation, load balancer 720 may receive voicemail data from recorded voicemails (not shown) and may forward the received data to one or more of servers 710A and 710B. Load balancer 710 may also receive request to retrieve audio files 460 from VVM server 130 and forward the received request to an appropriate one of servers 710A and 710B (e.g., to allow faster processing of the request). For example, VM server 120 may receive a request from VVM server 130 for an audio file and load balancer 720 may send the request to server 710A or 710B. Load balancer 720 may send the received requests in a round-robin fashion or based on the current load and/or processing power of the servers 710A and 710B. Load balancer 720 may be used for purposes other than load balancing, such as for routing regardless of load balancing.

While geographically redundant VM server clusters are shown in FIG. 7, in other implementations, server clusters may be used for other components of network 100. For example, VVM server 130, notification server 140, and/or gateway 150 may also be implemented in a cluster configuration. Also, although the communications and configurations of FIGS. 4-7 are shown separately for clarity, in some implementations, different recovery operations may be combined. For example, holds 510 of FIG. 5, denial-of-service messages 620 of FIG. 6, and/or geographic redundancy of FIG. 7 may be combined in a single VVM system to provide improved VVM recovery.

Figure 8:
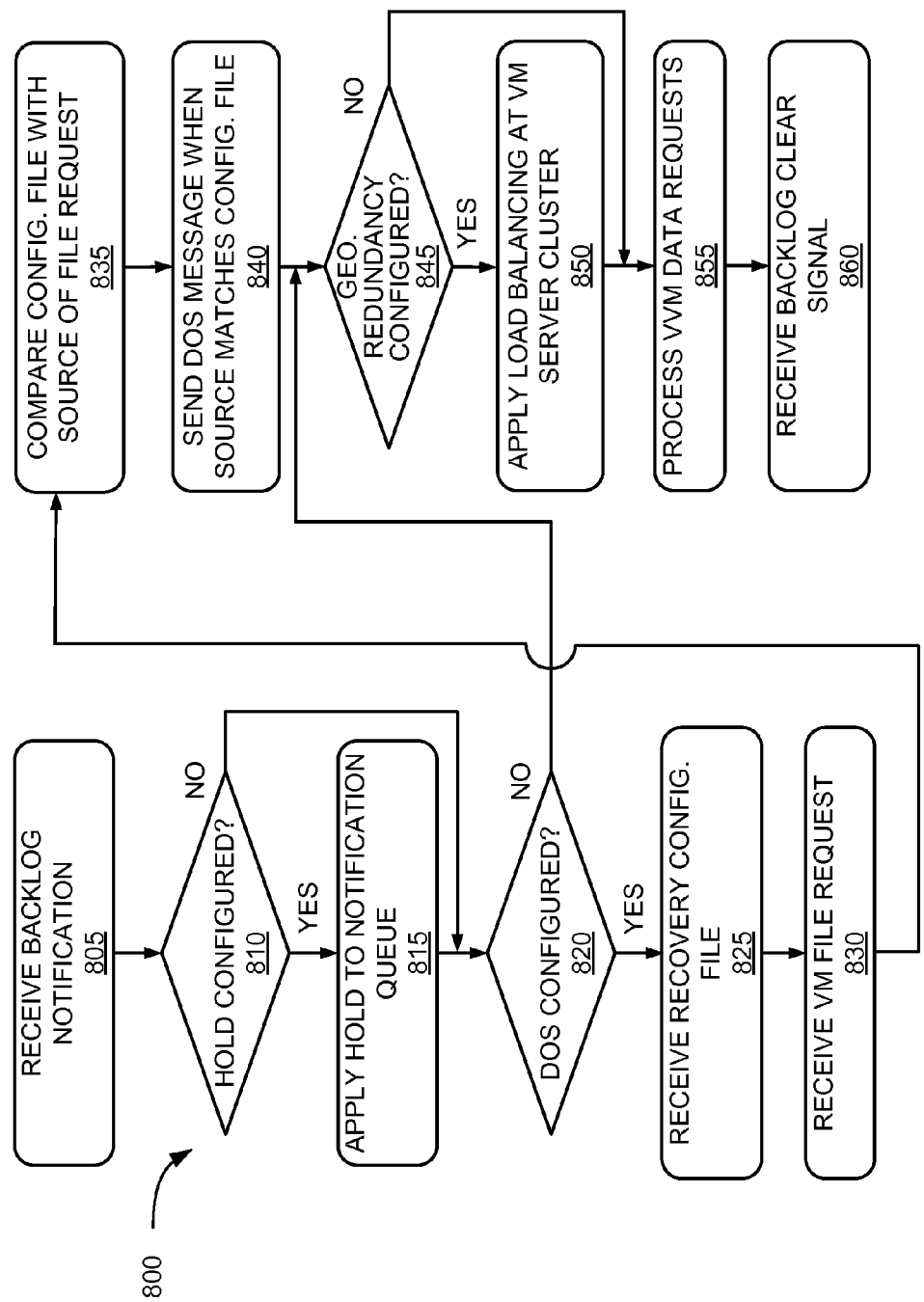
FIG. 8 is a flow chart of an exemplary process for performing visual voicemail system recovery according to an implementation described herein.

FIG. 8 is a flow chart of an example process for performing visual voicemail system recovery according to implementations described herein. In one implementation, process 800 may be performed by a group of devices including VM server 120, VVM server 130, and/or notification server 140. In another implementation, some or all of process 800 may be performed by another device or group of devices, including or excluding VM server 120, VVM server 130, and/or notification server 140.

As shown in FIG. 8, process 800 may include receiving a backlog notification (block 805) and determining if the VVM system is configured to hold notifications (block 810). For example, in implementations described above in connection with FIG. 5, notification server 140 may receive a backlog signal 500 indicating VVM traffic has exceeded the VVM system capacity. Alternatively, in implementations described above in connection with FIG. 6, VVM server 130 may receive a backlog signal 610 indicating VVM traffic has exceeded the VVM system capacity. In one implementation, notification server 140 may be configured to hold items in message distribution queue 415 during recovery (e.g., VVM system backlog) periods.

If the VVM system is configured to hold notifications (block 810-YES), a hold may be applied to the notification queue (block 815). For example, in implementations described above in connection with FIG. 5, backlog signal 500 may cause notification server 140 to hold new voicemail notifications (e.g., from VM notification 410) in queue 415, as indicated by reference number 510. The hold will prevent new notification messages (e.g., notification messages 420) from triggering additional activity in network portion 400.

If the VVM system is not configured to hold notifications (block 810-NO) or if a hold is applied, process 800 may include determining if the VVM system is configured to provide denial-of-service notifications (block 820). For example, in implementations described above in connection with FIG. 6, VVM server 130 may be configured to provide denial-of-service messages to particular types of user devices 110 during recovery (e.g., VVM system backlog) periods.

If the VVM system is configured to provide denial-of-service notifications (block 820—YES), process 800 may include receiving a recovery configuration file (block 825), receiving a voicemail file request (block 830), comparing the configuration file with the source of the voicemail file request (block 835), and sending a denial-of-service (DOS) message when the source matches the configuration file (block 840). For example, in implementations described above in connection with FIG. 6, VVM server 130 may receive a recovery configuration file 600. In one implementation, recovery configuration file 600 may include user device serial and/or model numbers, software versions, etc. that are known (or suspected) to generate retries. In response to VM alert 440, user device 110 may initiate session 450 to retrieve voicemail header information. Using session 450, user device 110 may provide device and/or application information associated with user device 110. In response to session 450, VVM server 130 may perform a lookup of recovery configuration file 600. Based on a comparison of the device and/or application information for user device 110 and recovery configuration file 600, VVM server 130 may return a denial-of-service message 620 to user device 110.

If the VVM system is not configured to provide denial-of-service notifications (block 820—NO), process 800 may include determining if a geographically redundant configuration is available (block 845). For example, in implementations described above in connection with FIG. 7, VM server 120 may include one or more computer systems such as, for example, a cluster of servers (e.g., in the same geographic area).

If the VVM system is configured to provide a geographically redundant configuration (block 845—YES), process 800 may include applying load balancing at a voicemail server cluster (block 850). For example, in implementations described above in connection with FIG. 7, as requests for services are received by VM server 120, these requests may be distributed across the different servers (e.g., servers 710A and 710B) in the cluster. For load balancing, a cluster may include a router (e.g., load balancer 720) for sending requests, for example, to the different servers.

If the VVM system is not configured to provide a geographically redundant configuration (block 845—NO) or if load balancing is applied, process 800 may include processing VVM data requests (block 855) and receiving a backlog clear signal (block 860). For example, in implementations described above in connection with FIG. 4, user device 110 may initiate a session (e.g., an HTTP connection) with VVM server 130 to retrieve the voicemail audio file, as indicated by reference 460. In one implementation, session 450 and session 460 may be the same. In response to retrieve audio file session 460, VVM server 130 may maintain the session with user device 110 while initiating another session (e.g., another HTTP connection) with VM server 120 to retrieve the voicemail audio file, as indicated by reference 465. VM server 120 may provide the voicemail audio file to VVM server 130 using session 465. VVM server 130 may then supply the voicemail audio file to user device 110 using session 460. When the VVM system has resumed normal levels of operation, notification server 140 may receive a cleared signal 520 and/or cleared configuration file 630 indicating VVM server 130 can resume receiving notification messages 420 and/or cease issuing denial-of-service messages 620.

Systems and/or methods described herein may reduce recovery times for data servers in a visual voicemail system by reducing retries from user devices during a recovery period. The systems and/or methods may reduce VVM traffic by slowing new voicemail notifications. The systems and/or methods may also stop or slow automatic retries from user devices during the recovery period. Additionally, or alternatively, the systems and/or methods may provide geographic redundancy to increase data server capacity during the recovery period.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method implemented by one or more computing devices in a visual voicemail system, the method comprising:
   receiving, by the one or more computing devices, a configuration file, wherein the configuration file includes one or more identifiers of a user device model or application that performs automatic retries to the visual voicemail system;
   receiving, by the one or more computing devices, voicemail notification messages indicating voicemails are available for a user of the visual voicemail system;
   distributing, by the one or more computing devices, the voicemail notification messages to a network device;
   receiving, by the one or more computing devices, an indication of a backlog processing requests for the visual voicemail system;
   stopping, by the one or more computing devices and based on the indication, distributing the voicemail notification messages to the network device;
   receiving, by the one or more computing devices and from a user device, a request to access to the visual voicemail system;
   sending, by the one or more computing devices and to the user device, a denial-of-service message when the request includes one of the one or more identifiers and when the request exceeds a threshold criteria for requests from the user device, wherein the denial-of-service message prevents the user device from sending another request;
   receiving, by the one or more computing devices and after the stopping, another indication that the backlog processing requests for the visual voicemail system no longer exists; and
   resuming, by the one or more computing devices and based on the other indication, distributing the voicemail notification messages to the network device.

2. The method of claim 1, wherein the voicemail notification messages are Hypertext Transfer Protocol (HTTP) messages.

3. The method of claim 1, further comprising:
   processing the request from the user device when the request does not include one of the one or more identifiers.

4. The method of claim 1, further comprising:
   receiving another configuration file, wherein the other configuration file does not include the one or more identifiers of a user device model or application;
   receiving, from the user device, an additional request to access to the visual voicemail system; and
   processing the additional request from the user device.

5. The method of claim 1, further comprising:
   receiving, from the network device, multiple requests to provide audio files associated with voicemail messages; and
   distributing, based on load balancing criteria, the multiple requests among at least two of the one or more computing devices.

6. The method of claim 5, wherein at least two of the one or more computing devices are configured with:
   a primary/backup configuration,
   a distributed load configuration, or
   a fully redundant configuration.

7. The method of claim 1, further comprising:
   receiving the threshold criteria identifying a number of allowed attempts to connect to the visual voicemail system by the user device within a particular period.

8. The method of claim 1, wherein processing requests for the visual voicemail system comprises:
   sending voicemail header information requested by user devices, or
   sending voicemail audio files requested by user devices.

9. A system, comprising:
   a memory to store a plurality of instructions; and
   one or more processors configured to execute instructions in the memory to:
      receive voicemail notification messages indicating voicemails are available for users of a visual voicemail system;
      distribute the voicemail notification messages to user devices associated with the voicemail notification messages;
      receive a recovery configuration file, wherein the recovery configuration file includes one or more identifiers of a user device model or application that causes user devices to automatically make repeated attempts to connect to the visual voicemail system;
      receive, from a particular user device, a request to access to the visual voicemail system; and
      send, to the particular user device, a denial-of-service message when the request includes one of the one or more identifiers and when the request exceeds a threshold criteria for requests from the user device, wherein the denial-of-service message prevents the user device from sending additional requests.

10. The system of claim 9, wherein the one or more processors is further configured to:
    process the request from the user device when the request does not include one of the one or more identifiers.

11. The system of claim 9, wherein the one or more processors is further configured to:
    receive, after receiving the recovery configuration file, a cleared configuration file wherein the cleared configuration file does not include the one or more identifiers of a user device model or application;
    receive, from the user device, another request to access to the visual voicemail system; and
    process the request from the user device.

12. The system of claim 9, wherein the one or more processors is further configured to:
    receive an indication of a backlog processing requests for the visual voicemail system;
    stop, based on the indication, distributing voicemail notification messages to a network device; and
    process the request from the user device when the request does not include one of the one or more identifiers.

13. The system of claim 9, wherein the one or more processors is further configured to:
    receive another indication that the backlog processing requests for the visual voicemail system no longer exists; and start, based on the other indication, distributing voicemail notification messages to the network device.

14. The system of claim 9, wherein the one or more processors is further configured to:
receive multiple requests to provide audio files associated with voicemail messages; and
distribute, based on load balancing criteria, the multiple requests among at least two computing devices for processing the multiple requests.

15. The system of claim 9, wherein the voicemail notification messages are short message service (SMS) messages.

16. The system of claim 9, wherein the one or more processors is further configured to:
receive the threshold criteria identifying a number of allowed attempts to connect to the visual voicemail system by individual user devices within a particular period;
receive, from another user device, another request to access to the visual voicemail system; and
send, to the other user device, another denial-of-service message when the other request exceeds the threshold criteria.

17. A non-transitory computer-readable medium, comprising computer-executable instructions, for causing one or more processors executing the computer-executable instructions to:
receive voicemail notification messages indicating voicemails are available for a user of the visual voicemail system;
distribute the voicemail notification messages to a network device;
receive a recovery configuration file, wherein the recovery configuration file includes one or more identifiers of a user device model or application that causes user devices to automatically make repeated attempts to connect to the visual voicemail system;
receive an indication of a backlog processing requests for the visual voicemail system;
stop, based on the indication, distributing the voicemail notification messages to the network device;
receive, from a particular user device, a request to access to the visual voicemail system; and
send, to the particular user device, a denial-of-service message when the request includes one of the one or more identifiers and when the request exceeds a threshold criteria for requests from the user device, wherein the denial-of-service message prevents the user device from sending another request.

18. The computer readable medium of claim 17, further comprising computer-executable instructions, for causing one or more processors executing the computer-executable instructions to:
receive another indication that the backlog processing requests for the visual voicemail system no longer exists; and
resume, based on the other indication, distributing the voicemail notification messages to the network device.

19. The computer readable medium of claim 18, wherein the computer-executable instructions for causing one or more processors executing the computer-executable instructions to perform data correlation further include instructions to:
receive, after receiving the recovery configuration file, a cleared configuration file wherein the cleared configuration file does not include the one or more identifiers of a user device model or application;
receive, from the particular user device, another request to access to the visual voicemail system; and
process the other request from the particular user device.

* * * * *